United States Patent [19]
Perina

[11] 3,777,435
[45] Dec. 11, 1973

[54] ATTACHMENT ASSEMBLY
[75] Inventor: Joseph Perina, Huntington, N.Y.
[73] Assignee: American Velcro Inc., New York, N.Y.
[22] Filed: Nov. 15, 1971
[21] Appl. No.: 198,657

[52] U.S. Cl............287/20.924, 52/753 C, 52/582, 52/511, 24/204
[51] Int. Cl.............................................. F16b 5/07
[58] Field of Search............ 287/189.36 D, 20.92 C, 287/20.92 R, 20.92 V; 52/582, 578, 511; 24/204, DIG. 18; 161/47, 48, 65

[56] References Cited
UNITED STATES PATENTS

| | | |
|---|---|---|
| 3,152,568 | 10/1964 | Mayer.................................. 52/582 |
| 3,127,259 | 3/1964 | Boylan.......................... 52/511 UX |
| 3,475,810 | 11/1969 | Mates........................... 24/DIG. 18 |
| 3,455,589 | 7/1969 | Valiulis............................ 24/204 X |

Primary Examiner—Jordan Franklin
Assistant Examiner—Wayne L. Shedd
Attorney—Dean S. Edmonds et al.

[57] ABSTRACT

An attachment assembly for releasably joining panels or partitions along their edges is disclosed which comprises two channel members each being secured along the edge portions of the panels to be joined. Separable fastening members are secured in each channel member in a manner permitting the fastening members to slide along each channel member. The panels or partitions are secured together by engagement of the fastening members on each channel member.

6 Claims, 4 Drawing Figures

PATENTED DEC 11 1973 3,777,435

INVENTOR.
JOSEPH PERINA
BY Pennie, Edmonds,
Morton, Taylor & Adams

ATTORNEYS

ATTACHMENT ASSEMBLY

BACKGROUND OF THE DISCLOSURE

I. Field of the Invention

This invention relates to an attachment assembly, and more particularly, to an attachment assembly for releasably securing together partitions, panels, plates or the like using separable fasteners.

II. Description of Prior Art

Separable fasteners such as the hook and loop fasteners described in U.S. Pat. Nos. 2,717,437 and 3,009,235 are widely used for the purpose of attaching one object to another. In general, fasteners of this type include separable members each having a pile-like surface of hooking elements. Upon being pressed together in face-to-face relationship, the hooking elements of the separable members releasably interengage one another to hold the members together. In the above-mentioned U.S. patents, each separable member comprises a sheet of woven synthetic material having raised loop threads wherein the loops of one member are cut at their outer extremeties to form hook-type hooking elements while the loop threads of the other member remain uncut to form loop-type hooking elements. When these two members are pressed together in face-to-face relationship, there is substantial engagement of the hook-type hooking elements with the loop-type hooking elements. A considerable effort must be applied to separate the members unless they are peeled apart in which case the members are separated quite easily.

Numerous problems are encountered when it is desired to join together two or more panels which can be readily disassembled and yet, when joined, exhibit a rigid and strong joint. In the construction industry where skilled and unskilled labor costs have increased drastically, modern - day techniques require a maximum of prefabrication or structural packaging as opposed to conventional piecemeal fitting by a mechanic, without sacrificing quality.

Various methods for securing together two or more panels are known in the art. Examples of these joining procedures are disclosed in U.S. Pat. Nos. 2,257,001 and 3,348,459. However these procedures do not provide for a quick and economical method for providing a rigid and strong joint which can be readily disassembled.

It is therefore the principal object of the present invention to provide an attachment assembly for releasably joining together two or more panels which avoids all of the disadvantages of the prior art procedures.

SUMMARY OF THE INVENTION

In accordance with the teachings of the present invention, there is provided an attachment assembly for releasably joining panels along their edge portions. In construction this assembly includes two channel members, each member being secured to the respective edge portions of the panels to be joined, each channel member including flanged edge portions. Backing strips are secured to each channel by being supported by the flanged edge portions in a manner permitting the backing strips to slide along their rear surfaces in each of the channel members. Fastening means including a multiplicity of hooking elements project from the opposite surface of each of the backing strips for securing the panels together.

It should be clear that the use of the terms hook and loop type fastener or hooks and loops are meant to include fasteners wherein a multiplicity of projections of one part of the fastener interengage with a multiplicity of twisted or randomly oriented fibers. In a preferred embodiment of the invention, the hooking elements which project from one member of the attachment assembly comprise tiny upstanding hooks of the type described in U.S. Pat. No. 2,717,437. As mentioned above, when these hook-type hooking elements are pressed into face-to-face relationship with a plurality of complimentary hooking elements in the form of tiny loops as described in U.S. pat. No. 3,009,235, the hooking elements projecting from the other members, a very large number of the hook-type and loop-type hooking elements become releasably interengaged. In accordance with the teachings of the last mentioned U.S. patent disengagement between the hook and hook type hooking elements is strongly resisted when forces are applied parallel or normal to the interfacial plane of engagement. As the attachment assembly of this invention is constructed to form a strong and rigid joint, it will be recognized that the attachment assembly of this invention compliments the nature of engagement between the hook and loop-type hooking elements.

It should also be understood that the use of the term "panels" includes partitions, plates and the like.

DESCRIPTION OF PREFERRED EMBODIMENTS

Figure 1:
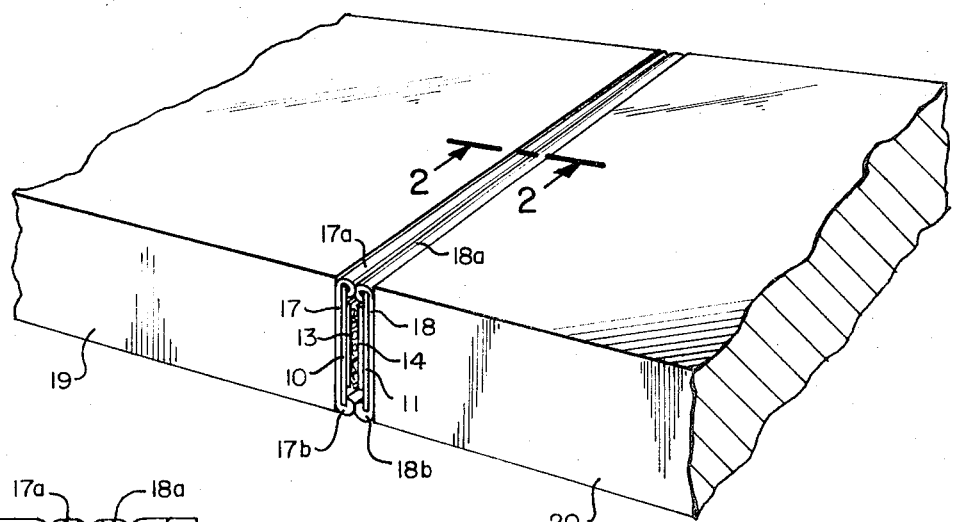
FIG. 1 is a perspective view of the attachment assembly according to the invention.
Figure 2:
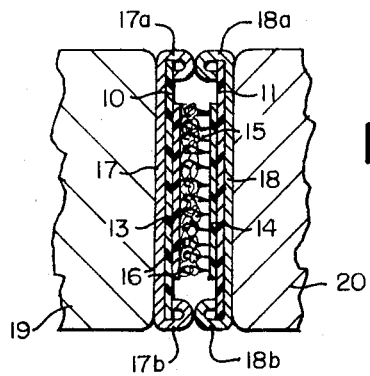
FIG. 2 is a cross-sectional view taken along line 2—2 of FIG. 1.

As shown in FIGS. 1 and 2, the attachment assembly according to the present invention includes strips 10 and 11 of a semi-rigid material which define backing members to one surface of which fastening members 13 and 14, also in the form of a strip, are secured by any suitable means, such as for example, by adhesively bonding the fastening members to the backing members. The outwardly facing surfaces of fastening members 13 and 14 are defined by a plurality of upwardly projecting hooking elements 15 and 16 of flexible resilient material. The backing members 10, 11 are semi-rigid in the sense that they are relatively stiff, but nevertheless flexible and resilient enough to bend under an applied stress and return to their initial configuration when the stress is relieved. For example, a plastic or metallic material having spring characteristics is suitable for the backing members.

Fastening member 14 has a surface defined by a plurality of upstanding hooking elements 16 which are raised loop threads of synthetic material such as super polyamide. The hooking elements 16 may be cut at their outer extremities to form hooks as shown in the present embodiment or they may be closed loops. Fastening member 13 has a surface defined by a plurality of complimentary hooking elements 15 which also are raised loop threads of synthetic material such as super polyamide. The complimentary hooking elements 15 may be closed loops as shown in the present embodiment or the loops may be cut at their outer extremities to form hooks. While hook-type hooking elements 16 have been provided on fastening tape 14 and loop-type hooking elements 15 have been provided on fastening tape 13, it is intended that they may be interchanged and thus hook-type hooking elements may be provided on tape 13 and loop-type hooking elements on tape 14. In fact, it is contemplated that a given tape surface could comprise both hook-type and loop-type hooking elements. When fastening tape members 13 and 14 are brought firmly into face-to-face engagement a large number of complimentary hooking elements 15 engage a large number of complimentary hooking elements 16. The elements, so engaged, resist separation, but may be separated readily by a peeling force applied substantially normal to the interfacial plane of engagement.

As shown in FIGS. 1 and 2, channel members 17 and 18 are secured to the edge portions of the two panels 19 and 20 to be joined together. The channel members are secured to the panels by any suitable means, as for example, by adhesively bonding the rear surface of the channel members to the panels or by using any of the conventional mechanical types of fasteners, e.g., nails, staples, etc. In the particular construction shown in the drawings, the channel members are provided with bent over flanged portions 17a, 17b and 18a, 18b respectively, which together define two opposed channels on opposite sides of each of the channel members.

To firmly join together panels 19 and 20, channel members 17 and 18 are first secured to the desired edge portions of the panels to be joined. Backing members 10 and 11 including their respective fastening members projecting therefrom are then simply inserted in each of the channel members by sliding each of the backing members in the spaces provided 17c, 17d and 18c, 18d between the flanged portions and the rear surface of each of the channel members. The backing members are secured in the channel members by the bent over flanged portions 17a, 17b and 18a, 18b as clearly shown in FIG. 2. Once assembled in this manner, the edge portions of panels 19 and 20 are brought into face-to-face relationship until the bent over flanged portions contact each other as shown in FIG. 2. When the channel members 17 and 18 are brought together in this manner, hooking elements 15 and 16 are brought into face-to-face relationship thereby causing a multiplicity of hooking elements 15 to interengage with a multiplicity of hooking elements 16 to thereby firmly and rigidly secure panels 19 and 20 together.

Figure 3:
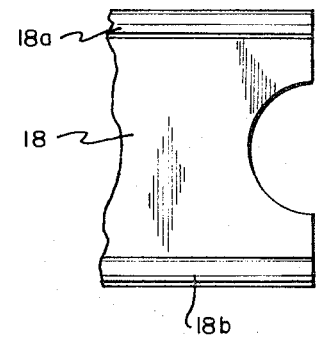
FIG. 3 is a fragmentary detail showing the end portion of a channel member.

When it is desired to disassemble the panels, this is accomplished easily and quickly by simply sliding backing members 10 and 11 out of the channel members. In order to facilitate the removal of the backing members, a groove similar to the groove shown in FIG. 3, is provided at each end portion of each of the channel members. These grooves allow for one to obtain a firm grasp on the backing members and thus easily slide these members out of the channels.

Figure 4:
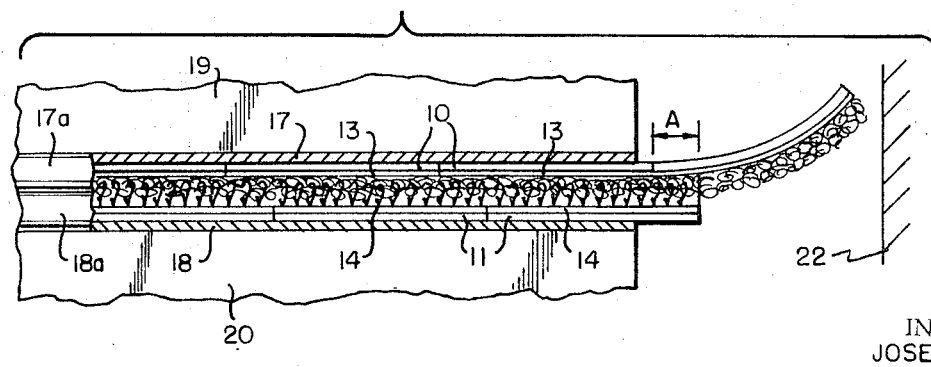
FIG. 4 is a cross-sectional view showing one embodiment of the invention.

In FIG. 4, an alternative embodiment of the attachment assembly according to the present invention is illustrated. In this embodiment the backing members comprise several strips, each strip having fastening members projecting therefrom. Using backing members in the form of strips is particularly useful when the panels are positioned close to another structure such as a wall 22 as shown in FIG. 4, thus limiting the space for removal of the backing members. If the backing members were formed of a continuous strip of material, it would be difficult to remove the backing members from the channel. This problem is avoided by using individual strips for the backing members. It is also preferred that the strips be assembled in an overlapping manner as designated in FIG. 4 by the letter A. This arrangement further increases the ease with which the backing members can be removed.

The fastening members 13 and 14 with hook-type or loop-type hooking elements projecting therefrom may comprise the woven hook-pile or loop-pile material described in U.S. pat. Nos. 2,717,437 and 3,009,235 or the knitted hook pile or loop-pile material described in copending and commonly assigned U.S. patent application Ser. No. 659,669, filed Aug. 10, 1967. Alternatively, these hook and loop-type hooking elements may consist of the molded plastic hook-pile or loop-pile material described in copending and commonly assigned U.S. patent application Ser. No. 824,597, filed May 14, 1969. In the event molded plastic material is used, the hooking elements may be molded integrally with the backing members 10 and 11.

I claim:

1. An attachment assembly for releasably joining two panels together along a joint defined by abutting edge portions of the panels comprising:
   a. first and second relatively rigid channel members secured to the respective edge portions of said panels;
   b. first and second flexible backing members slidably mounted within the respective channel members for selective removal therefrom;
   c. first and second complementary piles of releasably interengageable hooking elements disposed on the facing surfaces of the respective backing members, the hooking elements of said piles being characterized by the property that with the two piles in interengaged condition forming the joint separation of the panels is strongly resisted by forces to which the joint is normally subjected applied generally parallel or perpendicular to the interfacial plane of engagement between the piles, but quite readily effected by peeling the flexible backing members apart, each of said channel members being sufficiently rigid to prevent the application of peeling forces to the backing members when the piles are in interengaged condition; and
   d. retaining means for holding the backing members in slidably removable condition within the respective channel members in such a manner as to prevent each backing member from being otherwise removed from the respective channel member by forces to which the joint is normally subjected during use.

2. The attachment assembly according to claim 1 wherein:
   a. each backing member is sufficiently stiff to prevent it from being bent out of its retained position within the respective channel by forces to which the joint is normally subjected during use; and
   b. said retaining means includes a pair of oppositely disposed flanges carried by each of said channel members for engaging the opposite margins of said facing surface of the respective backing member.

3. An attachment assembly according to claim 2 wherein said channel members and backing members are continuous strips.

4. An attachment assembly according to claim 2 wherein the backing members each include a plurality of individual sections placed in end to end relationship along said channel members.

5. An attachment assembly according to claim 4 wherein the ends of said backing member sections in one channel member overlap the ends of said backing member sections in the other channel member.

6. An attachment assembly according to claim 2 wherein grooves are provided along the end portions of said channel members to facilitate removal of said backing members from said channels.

* * * * *